(12) United States Patent
Miyata

(10) Patent No.: US 9,619,182 B2
(45) Date of Patent: Apr. 11, 2017

(54) INFORMATION PROCESSING APPARATUS, PRINTING CONTROLLING METHOD, AND PROGRAM

(71) Applicant: CANON KABUSHIKI KAISHA, Tokyo (JP)

(72) Inventor: Junichi Miyata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/570,384

(22) Filed: Dec. 15, 2014

(65) Prior Publication Data

US 2015/0169259 A1 Jun. 18, 2015

(30) Foreign Application Priority Data

Dec. 18, 2013 (JP) ................................ 2013-261638

(51) Int. Cl.
*G06F 3/12* (2006.01)
*H04N 1/00* (2006.01)

(52) U.S. Cl.
CPC .......... *G06F 3/1204* (2013.01); *G06F 3/1267* (2013.01); *G06F 3/1272* (2013.01); *G06F 3/1273* (2013.01); *G06F 3/1282* (2013.01); *G06F 3/1285* (2013.01); *H04N 1/00334* (2013.01); *H04N 1/00482* (2013.01); *H04N 2201/0075* (2013.01); *H04N 2201/0082* (2013.01)

(58) Field of Classification Search
CPC .... G06F 3/1204; G06F 3/1272; G06F 3/1285; H04N 1/00334; H04N 1/00482; H04N 2201/0075; H04N 2201/0082

USPC ........................................................ 358/1.15
See application file for complete search history.

(56) References Cited

U.S. PATENT DOCUMENTS

| 8,184,307 | B2 * | 5/2012 | Evan .................... B42C 19/02 358/1.13 |
| 2006/0238800 | A1 * | 10/2006 | Czudak ................ G06F 3/1215 358/1.15 |
| 2008/0239398 | A1 * | 10/2008 | Nakagiri ............... G06K 15/02 358/1.18 |
| 2009/0037473 | A1 * | 2/2009 | Hiraguchi ................. 707/104.1 |

(Continued)

FOREIGN PATENT DOCUMENTS

| JP | 2006-001154 A | 1/2006 |
| JP | 2013-120509 A | 6/2013 |

OTHER PUBLICATIONS

Japanese office action issued in corresponding application No. 2013261638 on Nov. 8, 2016.

*Primary Examiner* — Kent Yip
(74) *Attorney, Agent, or Firm* — Carter, DeLuca, Farrell & Schmidt, LLP

(57) ABSTRACT

An order and elements constituting the order are hierarchically managed such that the order is in the uppermost level and the subsequent elements obtained hierarchically in the subsequent descending (higher to lower) steps are in the respective levels provided in descending (higher to lower) order. The range of the levels based on the level to which the element read by the bar code being the identifier of each element of the order is previously set as the range of the levels to be displayed as the candidates of the reprinting-target elements. Further, the bar code is previously printed on the printed material.

17 Claims, 16 Drawing Sheets

(56) References Cited

U.S. PATENT DOCUMENTS

2014/0118773 A1\* 5/2014 Mochizuki ............ G06F 3/1241
358/1.14
2014/0240738 A1\* 8/2014 Kadiyala .............. G06K 15/408
358/1.13

\* cited by examiner

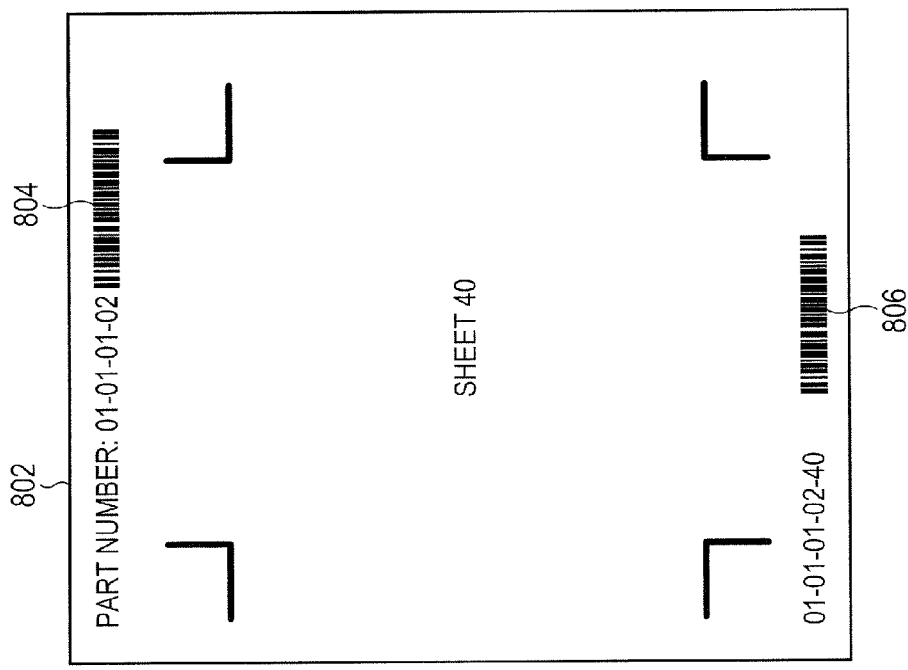
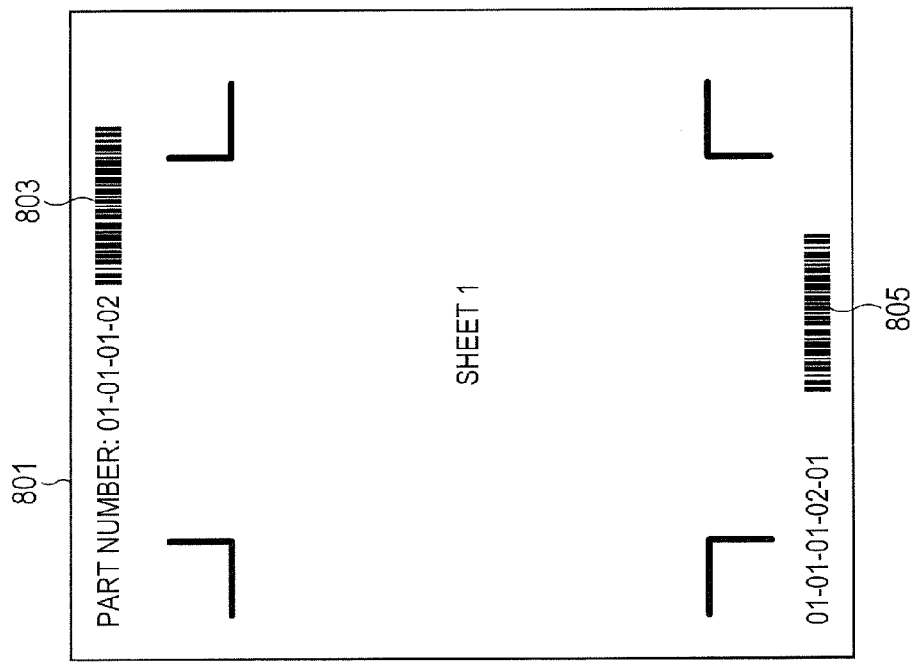
FIG. 8

FIG. 9A

PRINTING CANDIDATE SETTING

CANDIDATE IN BAR CODE READING
☑ SELECT LOWER CANDIDATE    901
   NUMBER OF LOWER LEVELS [1]  ~902

☐ SELECT HIGHER CANDIDATE    903
   NUMBER OF HIGHER LEVELS [ ]  ~904

FIG. 9B

PRINTING CANDIDATE SETTING

CANDIDATE IN BAR CODE READING
☐ SELECT LOWER CANDIDATE
   NUMBER OF LOWER LEVELS [ ]  ~905

☑ SELECT HIGHER CANDIDATE
   NUMBER OF HIGHER LEVELS [1]  ~906

PRINTING TARGET SELECTION

SHEET NUMBER: 01-01-01-01-01

ORDER NO. 01
DELIVERY DESTINATION NO. 01-01 ←—1001
PART: COVER

WERE READ
1ST SHEET OF COVER IS PRINTED

| OK | CANCEL |
| --- | --- |
| 1002 | 1003 |

PRINTING TARGET SELECTION

BOOK NUMBER: 01-01-01

ORDER NO. 01
DELIVERY DESTINATION NO. 01-01 ←—1101

◎ 1102 PRINT WHOLE OF BOOK

● 1103 DESIGNATE PART AND REPRINT

1104 → ☑ COVER
☑ BODY

| 1105 OK | 1106 CANCEL |
| --- | --- |

PRINTING TARGET SELECTION

BOOK NUMBER: 01-01-01

ORDER NO. 01
DELIVERY DESTINATION NO. 01-01 ◀—1201

◉   DESIGNATE BOOK TO BE PRINTED
1202 —▶ ☑ 01-01-01
1203 —▶ ☑ 01-01-02

| OK | CANCEL |
|---|---|
| 1204 | 1205 |

FIG. 16
1600

PRINTING

| PRINTING-TARGET LIST | ATTRIBUTE | NUMBER OF PRINTS | |
|---|---|---|---|
| 01-01-01-01-01.pdf | SHEET | 1 | ~1601 |

1602
OK

1603
CANCEL

FIG. 17
1700

PRINTING

| PRINTING-TARGET LIST | ATTRIBUTE | NUMBER OF PRINTS | |
|---|---|---|---|
| 01-01-01-01.pdf | COVER | 1 | ~1701 |
| 01-01-01-02.pdf | BODY | 1 | ~1702 |

1703
OK

CANCEL

PRINTING

| PRINTING-TARGET LIST | ATTRIBUTE | NUMBER OF PRINTS | |
|---|---|---|---|
| 01-01-01-01.pdf | COVER | 1 | ~1801 |
| 01-01-01-02.pdf | BODY | 1 | ~1802 |
| 01-01-02-01.pdf | COVER | 1 | ~1803 |
| 01-01-02-02.pdf | BODY | 1 | ~1804 |

1805

[ OK ]  [ CANCEL ]

PRINTING

| PRINTING-TARGET LIST | ATTRIBUTE | NUMBER OF PRINTS | |
|---|---|---|---|
| 01-01-01-01.pdf | COVER | 2 | ~1901 |
| 01-01-01-02.pdf | BODY | 2 | ~1902 |

[ OK ]  [ CANCEL ]

INFORMATION PROCESSING APPARATUS, PRINTING CONTROLLING METHOD, AND PROGRAM

BACKGROUND OF THE INVENTION

Field of the Invention

The present invention relates to an information processing apparatus, a printing controlling method, and a program. In particular, the present invention relates to a technique which is suitably used to reperform a printing job.

Description of the Related Art

In a field of electrophotographic printing and ink-jet printing apparatuses, as printing speeds becomes higher and obtained image qualities become higher in recent years, a market called a POD (print on demand) market which competes with conventional commercial printing industry is developing.

In the POD market, it aims to deal with a large number of prints and a large number of printing jobs with a short time for delivery without using a large-scale apparatus or system. To this end, in the POD market, digital image forming apparatuses such as a digital copier, a digital multifunctional machine and the like are maximally utilized.

In the POD market, to cope with diversification of output objects, the contents of post-processes such as a cutting process, a bookbinding process and the like to be performed after printing become complicated.

Incidentally, if a problem arises in a product obtained in a post-process, it is necessary to reperform working from the beginning of a printing process. In such a case, it is important to effectively perform such a reprinting process in terms of working efficiency.

Here, Japanese Patent Application Laid-Open No. 2013-120509 discloses that, in papers constituting an output object, reprinting is effectively performed to a failed page, a specific page range and the whole of failed parts, by using bar codes printed on the papers.

In Japanese Patent Application Laid-Open No. 2013-120509, although it is possible to perform the reprinting using the bar codes printed on the papers, there is a fear that workloads of an operator increases.

For example, if the operator wishes to reprint both the printed material of the cover and the printed material of the body, in the technique described in Japanese Patent Application Laid-Open No. 2013-120509, the operator first reprints the cover by performing the operation of reading the bar code of the cover, and next reprints the body by performing the operation of reading the bar code of the body. Namely, since the operator has to perform the bar-code reading operations as many as the number of times corresponding to the number of parts for which the reprinting is necessary, there is the fear that the workloads of the operator increases.

SUMMARY OF THE INVENTION

The present invention has been completed in consideration of such a problem as described above, and an object thereof is to reduce workloads of an operator when performing reprinting.

An information processing apparatus according to the present invention is characterized by comprising: an identifying unit configured to, in a case where, as an element constituting an order for a product obtained by at least performing printing, an identifier of any one of a plurality of elements including the product and a part constituting the product is read, identify the element identified by said identifier; a displaying unit configured to display a reprinting setting screen for accepting at least one of an instruction of lump reprinting of a printed material necessary in the identified element, an instruction of reprinting of a printed material necessary in a lower element constituting the identified element, and an instruction of reprinting of a printed material necessary in a higher element constituted by using the identified element; and an instructing unit configured to instruct reprinting of the printed material necessary in the element for which the instruction of reprinting is accepted by the reprinting setting screen.

Further features of the present invention will become apparent from the following description of exemplary embodiments with reference to the attached drawings.

BRIEF DESCRIPTION OF THE DRAWINGS

FIG. 8 is a diagram illustrating a second example of the printed result.

FIGS. 9A and 9B are diagrams illustrating user interfaces to be used for setting reprinting-target candidates.

FIG. 10 is a diagram illustrating a first example of a user interface for selecting a printing target.

FIG. 11 is a diagram illustrating a second example of the user interface for selecting the printing target.

FIG. 12 is a diagram illustrating a third example of the user interface for selecting the printing target.

FIG. 16 is a diagram, illustrating a first example of a printing job list displaying screen.

FIG. 17 is a diagram illustrating a second example of the printing job list displaying screen.

FIG. 18 is a diagram, illustrating a third example of the printing job list displaying screen.

FIG. 19 is a diagram illustrating a fourth example of the printing job list displaying screen.

DESCRIPTION OF THE EMBODIMENTS

Preferred embodiments of the present invention will now be described in detail in accordance with the accompanying drawings.

Figure 1:
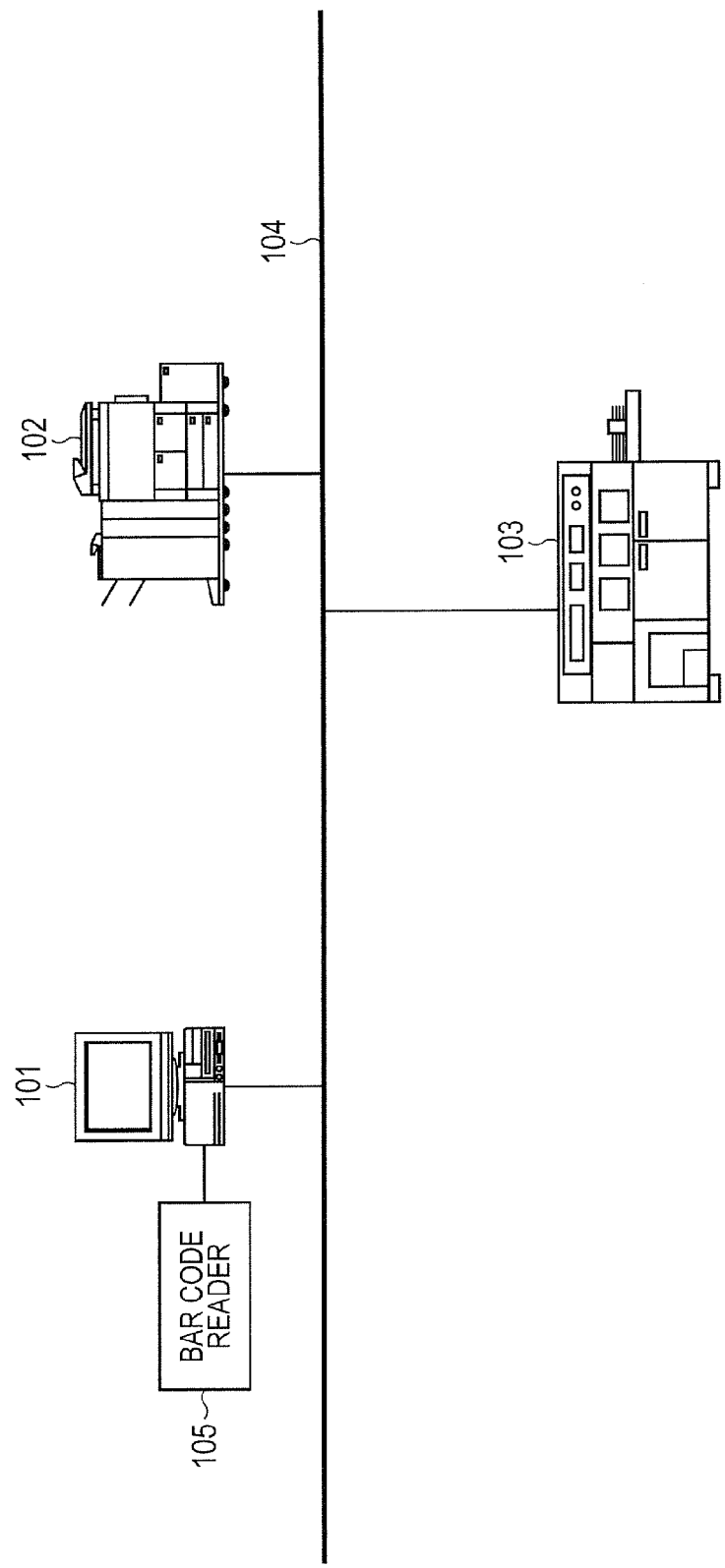
FIG. 1 is a diagram illustrating a configuration of a printing system.

FIG. 1 is a diagram illustrating a configuration of a printing system.

The printing system illustrated in FIG. 1 includes an information processing apparatus 101, a printing apparatus 102, a post-processing apparatus 103, a bar code reader 105 which operates on the information processing apparatus 101, and a network 104.

Incidentally, the information processing-apparatus 101 may be constituted by a plurality of information processing devices such that later-described job managing application and bar code application are arranged separately.

Figure 2:
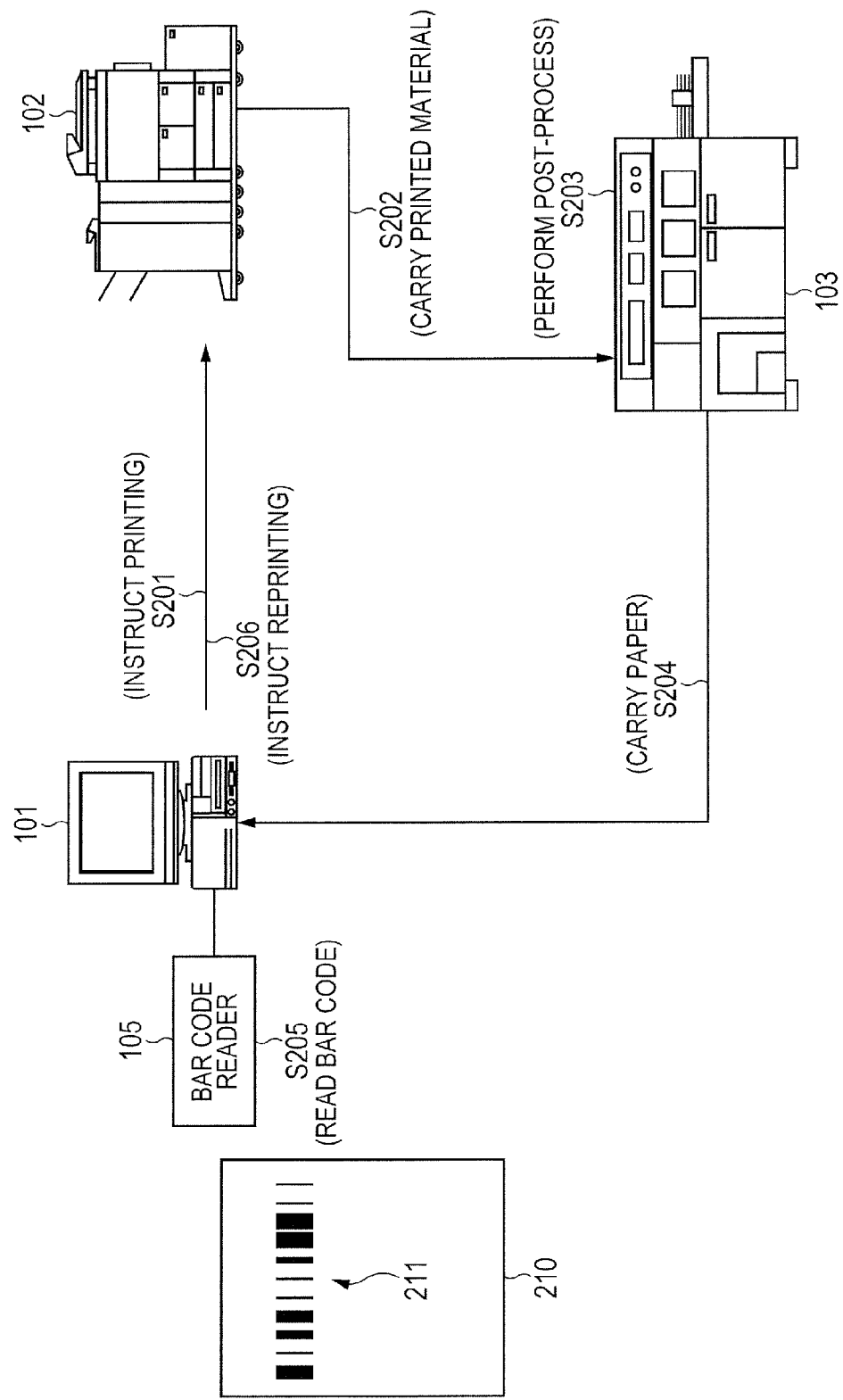
FIG. 2 is a diagram for describing an outline of an entire process by the printing system.

FIG. 2 is a diagram for describing an outline of an entire process by the printing system of FIG. 1, including the information processing apparatus 101, the printing apparatus 102, the post-processing apparatus 103 and the bar code reader 105.

In FIG. 2, in response to a job start, instruction by an operator who intends to produce a print product, the information processing apparatus 101 transmits printing data (printing instruction) to the printing apparatus 102 (S201). The printing apparatus 102 prints a later-described bar code on a paper and then outputs a printed material.

Next, the printed material output from, the printing apparatus 102 is carried by the operator to the post-processing apparatus 103 (S202).

Next, the post-processing apparatus 103 performs a post-process such as cutting, bookbinding and/or the like (S203).

If an operational error such as a cutting failure or the like occurs in the post-process and thus reprinting is necessary, the operator carries the printing-processed paper to which the operational error occurred to the information processing apparatus 101 (S204).

Next, the operator causes the bar code reader 105 to read a bar code 211 printed on a printing-processed paper 210 (S205). The bar code reader 105 outputs the information of the rad bar code 211 to the information processing apparatus 101. The information processing apparatus 101 again transmits the printing data (reprinting instruction) to the printing apparatus 102, based on the information identified, by the bar code 211 input from the bar code reader 105 (S206).

Figure 3:
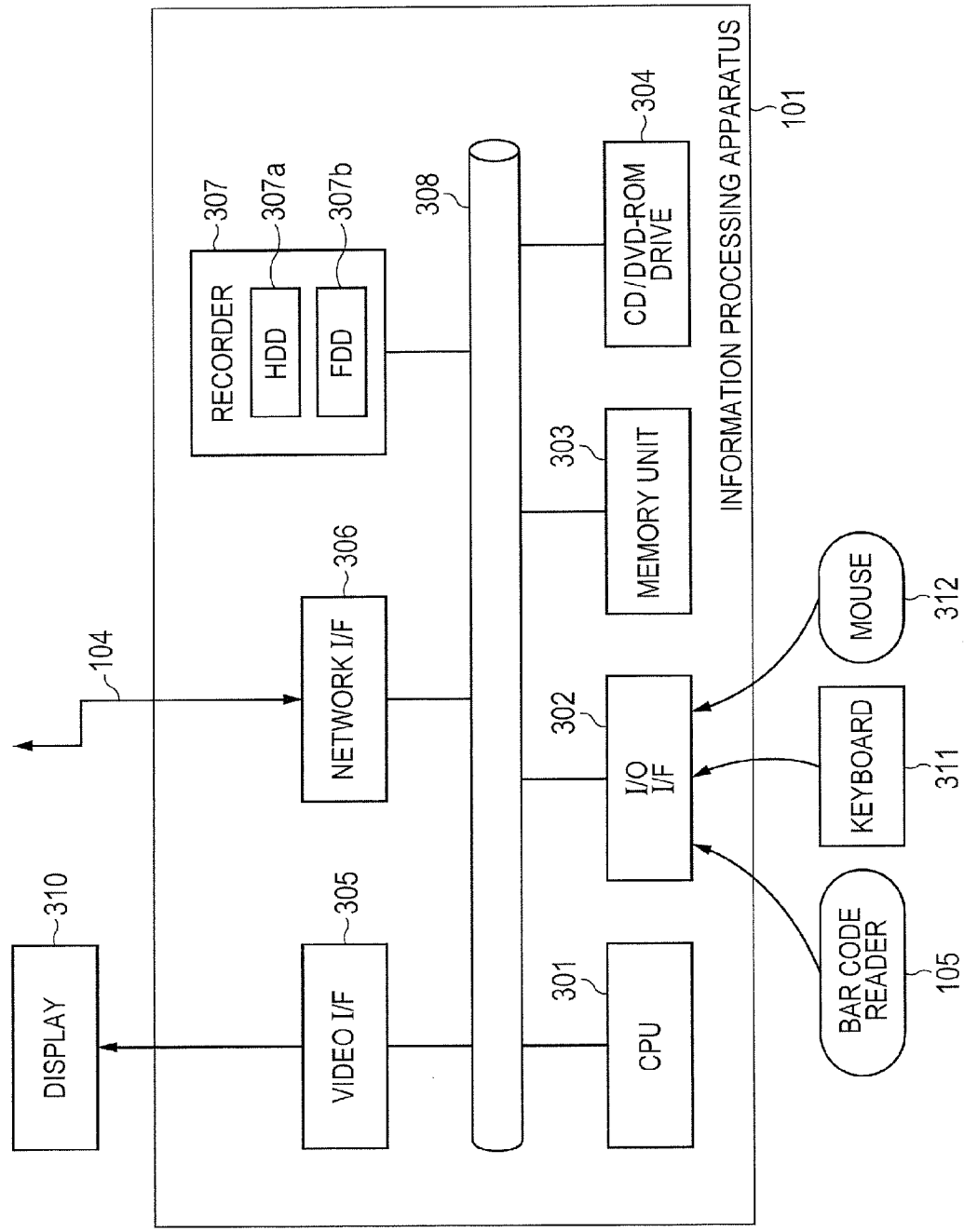
FIG. 3 is a block diagram illustrating a hardware constitution of an information processing apparatus.

FIG. 3 is a block diagram illustrating a hardware constitution of the information processing apparatus 101.

An inputting device is connected to the information processing apparatus 101. As the inputting device, a keyboard 311, a pointing device such as a mouse 312, the bar code reader 105 and the like are used. Further, a display 310 is connected to the information processing apparatus 101.

A network I/F (interface) 306 connects the information processing apparatus 101 to the network 104 such that the information processing apparatus 101 is connected to another computer on the network 104. Here, as the network 104, for example, a LAN (local area network) or a WAN (wide area network) is used.

A CPU (central processing unit) 301 is a processor unit which totally controls the information processing apparatus 101. A memory unit 303, which includes a RAM (random access memory) and a ROM (read only memory), functions as a memory area for data and programs and a working area to be used when programs are executed.

A video I/F 305 connects the information processing apparatus 101 to the display 310. An I/O (input/output) I/F 302 connects the inputting devices such as the keyboard 311, the mouse 312 and the bar code reader 105, or the like to the information processing apparatus 101.

A recorder 307 includes an HDD (hard disk drive) 307a and an FDD (flexible disk drive) 307b. A CD/DVD-ROM (compact disk/digital versatile disk-read only memory) drive 304 is provided as a non-volatile data source. A reprinting controlling program for achieving a procedure indicated in a later-described flow chart is stored in a computer-readable storage medium such as the recorder 307 or the like. Besides, the reprinting controlling program is loaded from the storage medium and then executed by the CPU 301 of the information processing apparatus 101.

The above constituent elements 301 to 307 in the information processing apparatus 101 are connected to a bus 308 so as to be able to mutually communicate with other.

Figure 4:
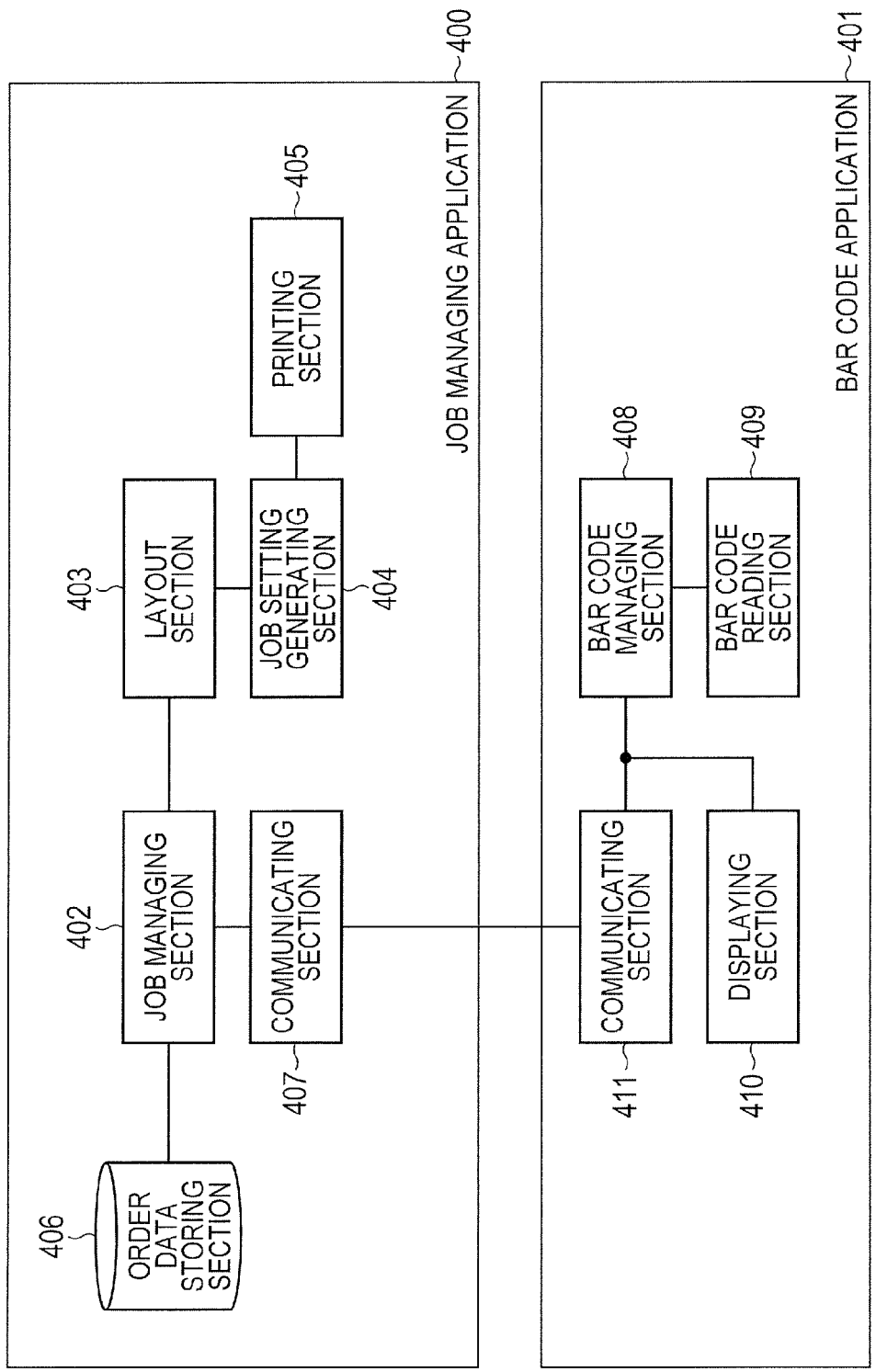
FIG. 4 is a block diagram illustrating a software configuration of a reprinting controlling program.

FIG. 4 is a block diagram illustrating an example of the software configuration of the reprinting controlling program operating on the information processing apparatus 101.

The reprinting controlling program includes a job managing application 400 and a bar code application 401.

In FIG. 4, the job managing application 400 is the application program for managing a printing job, and the bar code application 401 is the application program for performing a bar code process.

As exemplarily shown in FIG. 2, an optimum reprinting target is identified on the premise that the bar code application 401 reads the bar code printed on the printing paper through the bar code reader 105. The job managing application 400 instructs the printing apparatus 102 to reprint the reprinting target specified by the bar code application 401.

In FIG. 4, the job managing application 400 includes respective modules of a job managing section 402, a layout section 403, a job setting generating section 404, a printing section 405, an order data storing section 406 and a communicating section 407.

The job managing section 402 controls the overall process of the job managing application 400, and the layout section 403 performs layout such as arrangement of a drawing object such as a bar code, imposition or the like to the printing data. The job setting generating section 404 generates printing settings such as copy number setting, two-sided printing setting, color setting and the like to the printing data. The printing section 405 transmits the printing data to the printing apparatus 102, the order data storing section 406 stores order data, and the communicating section 407 performs communication with the bar code application 401.

If the printing instruction to the order data stored in the order data storing section 406 is received from the operator, the job managing section 402 generates controlling setting of the printing apparatus 102. More specifically, the job managing section 402 generates the controlling setting of the printing apparatus 102 such that the layout section 403 can perform later-described layout to the order data (see FIGS. 7 and 8) and the job setting generating section 404 can obtain a desired printed material. Then, the printing section 405 transmits the printing data based on the controlling setting of the printing apparatus 102 to the printing apparatus 102, and thus the printing process is performed.

The bar code application 401 includes respective modules of a bar code managing section 408, a bar code reading section 409, a displaying section 410 and a communicating section 411.

The bar code managing section 408 controls the overall process of the bar code application 401. The bar code reading section 409 reads a later-described bar code, the displaying section 410 displays a later-described user interface to the operator, and the communicating section 411 performs communication with the job managing application 400.

The bar code application 401 performs, e.g., a process according to a flow chart of later-described FIG. 13. If the bar code of the printed material is read by the bar code reader 105 (see S205 in FIG. 2), the bar code reading section 409 inputs the information of the read bar code 211. The bar code managing section 408 displays the user interface which depends on the read bar code 211 through the displaying section 410.

If reprinting is instructed on the user interface by the operator, the bar code managing section 408 instructs the reprinting to the job managing section 402 through the communicating section 411. The job managing section 402 again transmits the printing data to which the reprinting was instructed to the printing apparatus 102 through the printing section 405, thereby achieving the reprinting.

Figure 5:
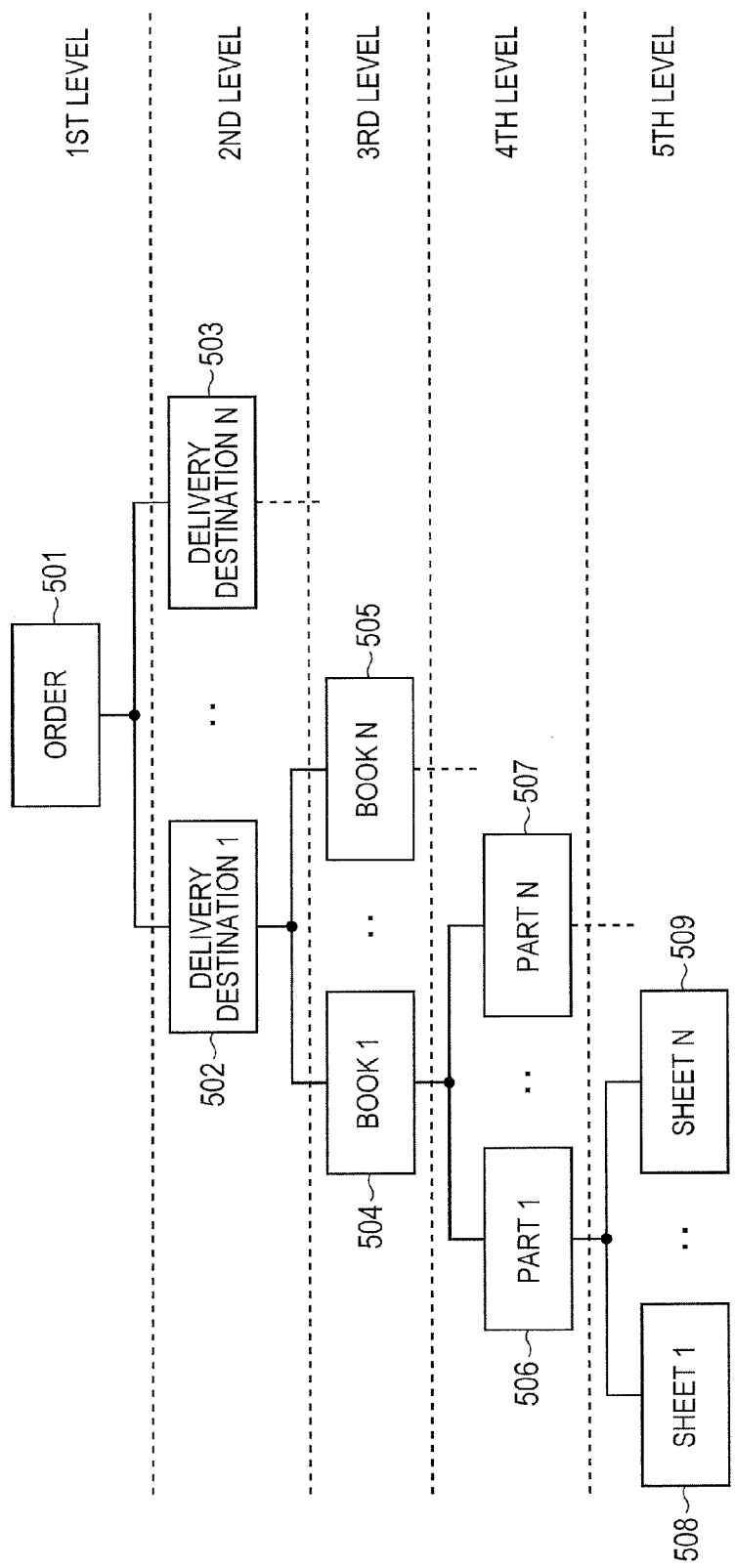
FIG. 5 is a diagram conceptually illustrating order data.

FIG. 5 is a diagram conceptually illustrating an example of the order data stored in the order data storing section 406.

A final product is produced by printing and processing of the order data illustrated in FIG. 5.

The order data illustrated in FIG. 5 has a hierarchy (having first to fifth levels). In the example illustrated in FIG. 5, the order data has the hierarchy which is constituted, by an order, delivery destinations, books, parts and sheets in order from the higher level.

In the above hierarchy, the order data is represented by an order 501, and it is indicated that the order 501 is constituted by a plurality of delivery destinations 502 to 503 (delivery destinations 1 to N). Moreover, it is indicated that the one delivery destination is constituted by a plurality of books 504 to 505 (books 1 to N), the one book is constituted by a plurality of parts 506 to 507 (parts 1 to N) (i.e., examples of first, and second parts), and the one part is constituted by a plurality of sheets (papers) 508 to 509 (sheets 1 to N).

Figure 6:
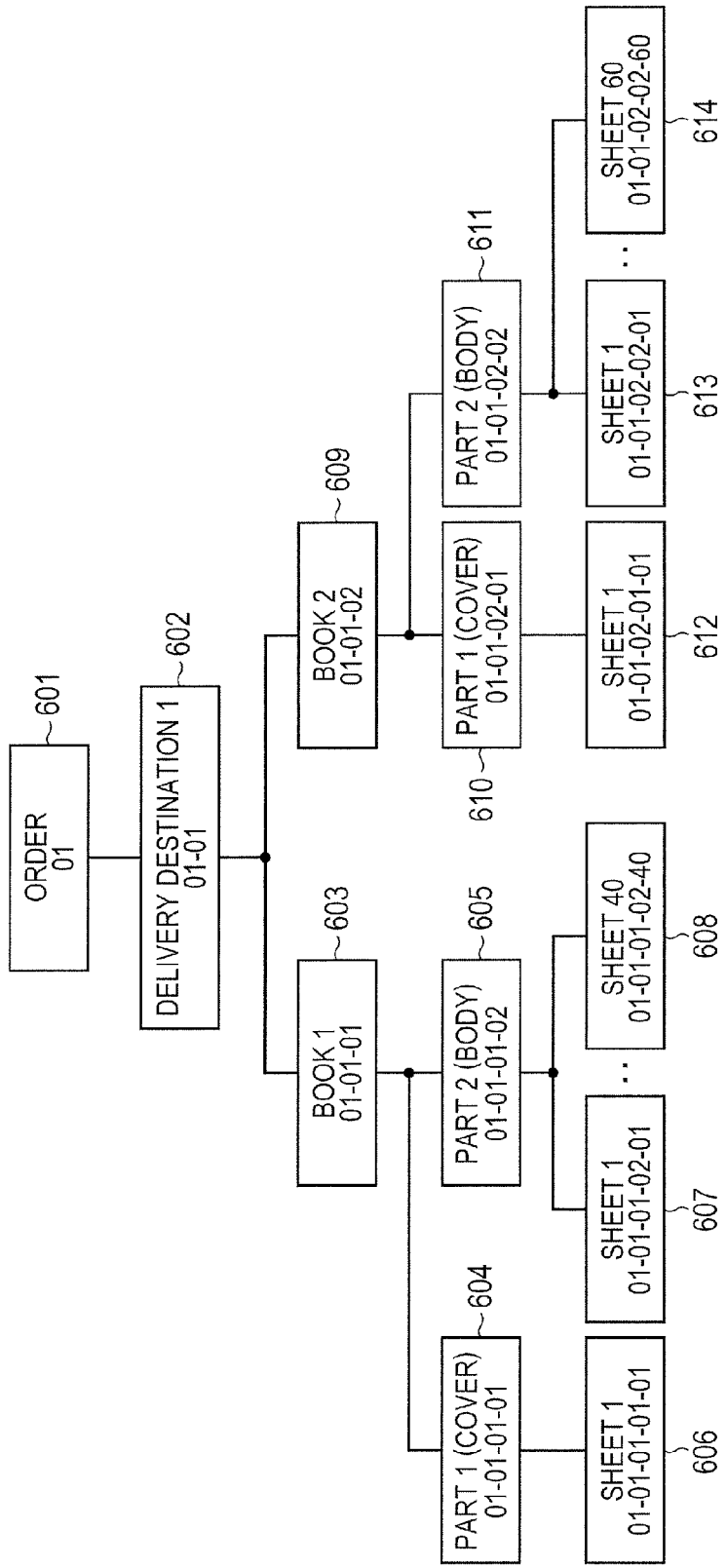
FIG. 6 is a diagram conceptually illustrating a concrete example of the order data.

FIG. 6 is a diagram conceptually illustrating a concrete example of the order data illustrated in FIG. 5.

In the order data illustrated in FIG. 6, one order 601 is constituted by a delivery destination 602 (delivery destination 1) so that that the print product is delivered to the sole delivery destination, and two books of books 603 and 609 (books 1 and 2) are delivered to the delivery destination 602 (delivery destination 1).

Further, the book 603 (book 1) is constituted by two parts of a part 604 (part 1) indicating a cover and a part 605 (part 2) indicating a body. Furthermore, the part 604 (part 1) is constituted, by one sheet 606 (sheet 1) and the part 605 (part 2) is constituted by 40 sheets of sheets 607 to 608 (sheets 1 to 40).

Likewise, the book 609 (book 2) is constituted by two parts of a part 610 (part 1) indicating a cover and a part 611 (part 2) indicating a body. Further, the part 610 (part 1) is constituted by one sheet 612 (sheet 1) and the part 611 (part 2) is constituted by 60 sheets of sheets 613 to 614 (sheets 1 to 60).

Besides, in the hierarchy illustrated in FIG. 6, a numerical value in each element represented by the "01-01-" form indicates an identifier for uniquely identifying the relevant element.

The relevant element is represented by combination with the higher-level identifiers with delimiters ("-").

The identifiers (i.e., each numeral added subsequent to the last delimiter) which identify the elements of the same level are represented by serial numbers.

More specifically, the order 601 is identified by the identifier "01", the delivery destination 602 (delivery destination 1) is identified by the identifier "01-01", the book 603 (book 1) is identified by the identifier "01-01-01", and the book 609 (book 2) is identified by the identifier "01-01-02".

The part 604 (part 1) constituting the book 603 (book 1) is identified by the identifier "01-01-01-01", and the part 605 (part 2) constituting the book 603 (book 1) is identified by the identifier "01-01-01-02".

The sheet 606 (sheet 1) constituting the part 604 (part 1) is identified by the identifier "01-01-01-01-01", the sheet 607 (sheet 1) constituting the part 605 (part 2) is identified by the identifier "01-01-01-02-01", and the sheet 608 (sheet 40) constituting the part 605 (part 2) is identified by the identifier "01-01-01-02-40".

The part 610 (part 1) constituting the book 609 (book 2) is identified by the identifier "01-01-02-01", and the part 611 (part 2) constituting the book 609 (book 2) is identified by the identifier "01-01-02-02".

The sheet 612 (sheet 1) constituting the part 610 (part 1) is identified by the identifier "01-01-02-01-01", the sheet 613 (sheet 1) constituting the part 611 (part 2) is identified by the identifier "01-01-02-02-01", and the sheet 614 (sheet 60) constituting the part 611 (part 2) is identified by the identifier "01-01-02-02-60".

Figure 7:
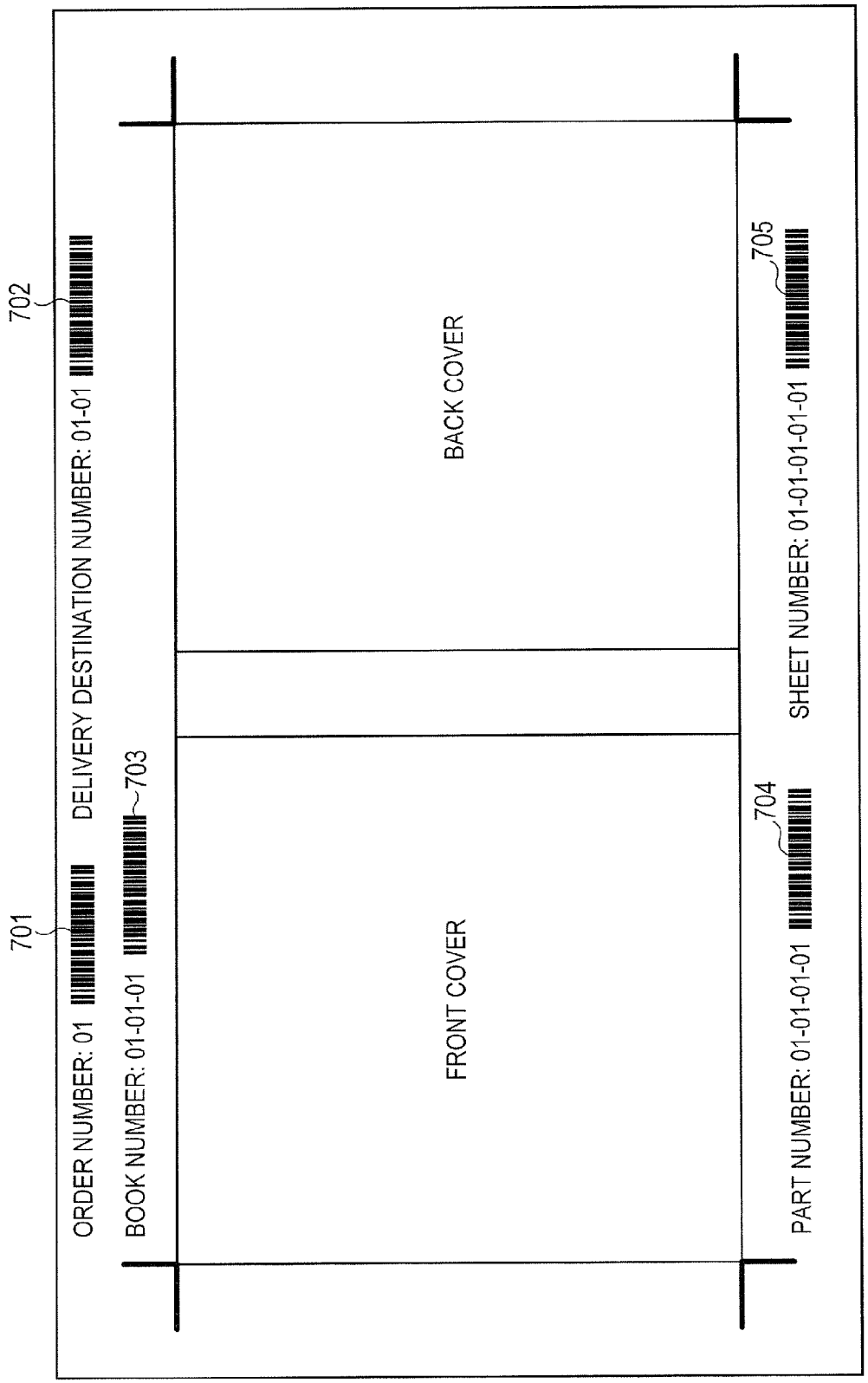
FIG. 7 is a diagram illustrating a first example of the printed result.

As exemplarily illustrated in FIG. 7, each of the above identifiers is printed, on a printing paper as a bar code.

FIG. 7 is the diagram illustrating an example of the printed result of the printing data of the cover of the part 604 (part 1) constituting the book 603 (book 1). As described above, the layout to the printing data is performed by the layout section 403.

In FIG. 7, a bar code string 701 represents the identifier of the order 601 in bar code form, a bar code string 702 represents the identifier of the delivery destination 602 (delivery destination 1) in bar code form, a bar code string 703 represents the identifier of the book 603 (book 1) in bar code form, a bar code string 704 represents the identifier of the part 604 (part 1) in bar code form, and a bar code string 705 represents the identifier of the sheet 606 (sheet 1) in bar code form.

On the premise that the bar code application 401 reads the above bar codes through the bar code reader 105, the job managing application 400 performs a reprinting process.

As well as FIG. 7, FIG. 8 is a diagram illustrating an example of the printed result of the printing data of the body of the part 605 (part 2) constituting the book 603 (book 1). As described above, the layout to the printing data is performed by the layout section 403.

In FIG. 8, a printed result 801 indicates the printed result of the sheet 607 (sheet 1) of the book 603 (book 1), and a printed result 302 indicates the printed result of the sheet 608 (sheet 40) of the book 603 (book 1).

Bar code strings 803 and 805 are printed (drawn) on the printed result 801 of the sheet 607 (sheet 1) of the book 603 (book 1). More specifically, the bar code string 803 represents the identifier of the part 605 (part 2) in bar code form, and the bar code string 805 represents the identifier of the sheet 607 (sheet 1) in bar code form.

Meanwhile, bar code strings 804 and 806 are printed on the printed result 802 of the sheet 608 (sheet 40) of the book 603 (book 1).

More specifically, the bar code string 804 represents the identifier of the part 605 (part 2) in bar code form, and the bar code string 806 represents the identifier of the sheet 608 (sheet 40) in bar code form.

On the premise that the bar code application 401 reads the above bar codes through the bar code reader 105, the job managing application 400 performs a reprinting process.

FIGS. 9A and 9B are diagrams respectively illustrating first and second examples of user interfaces to be displayed by the displaying section 410 of the bar code application 401. Here, each of the user interfaces illustrated in FIGS. 9A and 9B is the interface to be used for the bar code application 401 to perform display setting to display a reprinting-target candidate in the bar code reading.

In FIG. 9A, a check box 901 is used for the operator to previously instruct to display, as the reprinting-target candidate, the level lower than the level (e.g., the level of book) specified by the bar code in the bar code reading.

An edit box 902 is used for the operator to previously indicate the number of levels to be displayed as the reprinting-target candidates, among the levels lower than the level specified by the bar code, in the bar code reading. Namely, the edit, box 902 is used to instruct to display, as the reprinting-target candidates, how many levels lower than the level specified by the bar code, in the bar code reading.

Likewise, a check box 903 is used for the operator to previously instruct to display, as the reprinting-target candidate, the level higher than the level (e.g., the level of book) specified by the bar code in the bar code reading.

An edit box 904 is used for the operator to previously indicate the number of levels to be displayed as the reprinting-target candidates, among the levels higher than the level specified by the bar code, in the bar code reading. Namely, the edit box 904 is used to instruct to display, as the reprinting-target candidates, now many levels higher than the level specified by the bar code, in the bar code reading.

More specifically, a case where the check box 901 is "ON (check)" and "1" is set as the number of lower levels in the edit box 902 will be described. In this case, if the bar code ("01-01-01") of the book 603 (book 1) is read, the one level lower than the level of the book 603 (book 1), i.e., the level of the part 604 (part 1) and the part 605 (part 2), is set as the printing-target selection candidate.

Incidentally, on each of the user interfaces illustrated, in FIGS. 9A and 9B, only either one of the levels higher and lower than the level specified by the bar code is selected. However, it is possible to select both the levels higher and lower than the identified level. In this case, both the check boxes 901 and 903 are selected and checked.

For instance, in the present embodiment, an example of a reprinting-target setting screen is achieved by the user interfaces respectively illustrated in FIGS. 9A and 9B, and an example of a second displaying unit is achieved by the process of displaying the relevant user interfaces.

Each of FIGS. 10 to 12 is a diagram illustrating an example of the user interface to be displayed by the displaying section 410 of the bar code application 401. Namely, in these figures, the user interfaces for performing different displays respectively according to the levels of elements identified by the read bar codes are exemplarily shown.

More specifically, FIG. 10 exemplarily shows the user interface which is displayed by the displaying section 410 of the bar code application 401 in a case where the setting illustrated in FIG. 9A is performed and the identifier of the sheet 606 (sheet 1) illustrated in FIG. 6 is read in bar code form.

FIG. 9A indicates the setting of displaying the element of the level lower by one than the level of the element identified by the read bar code. However, as illustrated in FIG. 6, since a level lower than the level of the sheet 606 (sheet 1) does not exist, any printing-target selection candidate is not displayed.

Moreover, on a user interface 1000 illustrated in FIG. 10, a higher level displaying portion 1001 indicating the respective information of the level higher than the sheet 606 (sheet 1) is displayed.

The operator depresses an OK button 1002 on the user interface 1000 to decide, as the printing target, the element identified by the read bar code. Incidentally, if the operator wishes to cancel the printing indicated on the user interface 1000, he/she depresses a cancel button 1003.

FIG. 11 exemplarily shows the user interface which is displayed by the displaying section 410 of the bar code application 401 in a case where the setting illustrated in FIG. 9A is performed and the identifier of the book 603 (book 1) illustrated in FIG. 6 is read in bar code form.

FIG. 9A indicates the setting of displaying the element of the level lower by one than the level of the element identified by the read bar code. As illustrated in FIG. 6, the part 604 (part 1) and the part 605 (part 2) exist in the level lower by one than the level of the book 603 (book 1). Therefore, on a user interface 1100 illustrated in FIG. 11, a radio button 1102 indicating that the whole of the book is set to the printing target as the printing-target selection candidate is displayed.

Further, on the user interface 1100 illustrated in FIG. 11, a radio button 1103 indicating that the part designated from the respective parts constituting the book is set to the printing target is displayed. Furthermore, on the user interface 1100 illustrated in FIG. 11, a check box 1104 for selecting the printing-target selection targets ("cover" and "body") when the radio button 1103 is depressed is displayed.

Furthermore, on the user interface 1100 illustrated in FIG. 11, a higher level displaying portion 1101 indicating the respective information of the level higher than the book 603 (book 1) is displayed.

The operator depresses the radio button 1102 (selecting the printing of the whole of the book), or depresses the radio button 1103 and further selects the check box 1104 (selecting the part intended to be printed from the parts constituting the book), and the operator then depresses an OK button 1105. By doing so, the operator decides, as the printing target, the element selected on the user interface 1100. Incidentally, if the operator wishes to cancel the printing indicated on the user interface 1100, he/she depresses a cancel button 1106.

Incidentally, for example, in a case where the setting illustrated in FIG. 9A is performed and also the identifier of the part 605 (part 2) illustrated in FIG. 6 is read in bar code form, it is possible to adopt the configuration same as that of the user interface 1100 illustrated in FIG. 11. That is, reprinting of the whole of the part 605 (part 2) is designated by the radio button 1102, and reprinting of the sheets 607 to 608 (sheets 1 to 40) constituting the part 605 (part 2) is designated by the radio button 1103. At this time, it is possible to individually (i.e., in one unit) designate the sheet for the reprinting, and it is also possible to designate the sheets for the reprinting in plural units by, for example, enabling to designate a page range. Further, it is possible to properly combine the one-unit designation and the plural-unit designation (for example, it is possible to designate the first page and the third to tenth pages).

Further, in FIG. 9K, in a case where the check box 901 is checked and "2" is input to the edit box 902, for example, it is possible to additionally display the following contents on the user interface 1100 illustrated in FIG. 11. First, two radio buttons which can be selected when the part ("cover" or "body") is selected in the check box 1104 are displayed. More specifically, as the two radio buttons, the radio button for instructing to reprint the parts in a lump and the radio button for instructing to reprint the part in units of sheets constituting the part are displayed. Here, in case of performing the reprinting in units of sheets constituting the part, as described above, it is possible to designate the sheets for the reprinting in one unit or in plural units.

FIG. 12 exemplarily shows the user interface which is displayed by the displaying section 410 of the bar code application 401 in a case where the setting illustrated, in FIG. 9B is performed and the identifier of the book 603 (book 1) illustrated in FIG. 6 is read in bar-code form.

FIG. 9B indicates the setting of displaying the element of the level higher by one than the level of the element identified by the read bar code. Further, as illustrated in FIG. 6, the delivery destination 602 (delivery destination 1) exists in the level higher by one than the level of the book 603 (book 1). Therefore, on a user interface 1200 illustrated in FIG. 12, check boxes 1202 and 1203 for individually selecting the respective books 603 and 609 (books 1 and 2) related, to the same delivery destination 602 (delivery destination 1) as the printing-target selection candidate are displayed. As just described, in the example illustrated in FIG. 12, the books 603 and 609 (books 1 and 2) are given as first and second products respectively.

Furthermore, on the user interface 1200 illustrated in FIG. 12, a higher level displaying portion 1201 indicating the respective information of the level higher than the book 603 (book 1) is displayed.

The operator performs selection to the check boxes 1202 and 1203 (selecting the book intended to be printed from the books related to the same delivery destination), and then depresses an OK button 1204. By doing so, the operator decides, as the printing target, the element selected on the user interface 1200. Incidentally, it the operator wishes to cancel the printing indicated on the user interface 1200, he/she depresses a cancel button 1205.

Incidentally, on the user interface 1200 illustrated in FIG. 12, in addition to the individual printing of the books 603 and 604 (books 1 and 2), it is possible to designate lump printing (batch printing) of the books 603 and 604 (books 1 and 2).

In the present embodiment, an example of the reprinting-target setting screen is achieved by the user interfaces 1100 and 1200 respectively illustrated in FIGS. 11 and 12, and an example of the displaying unit is achieved by the process of displaying the relevant user interfaces.

Figure 13:
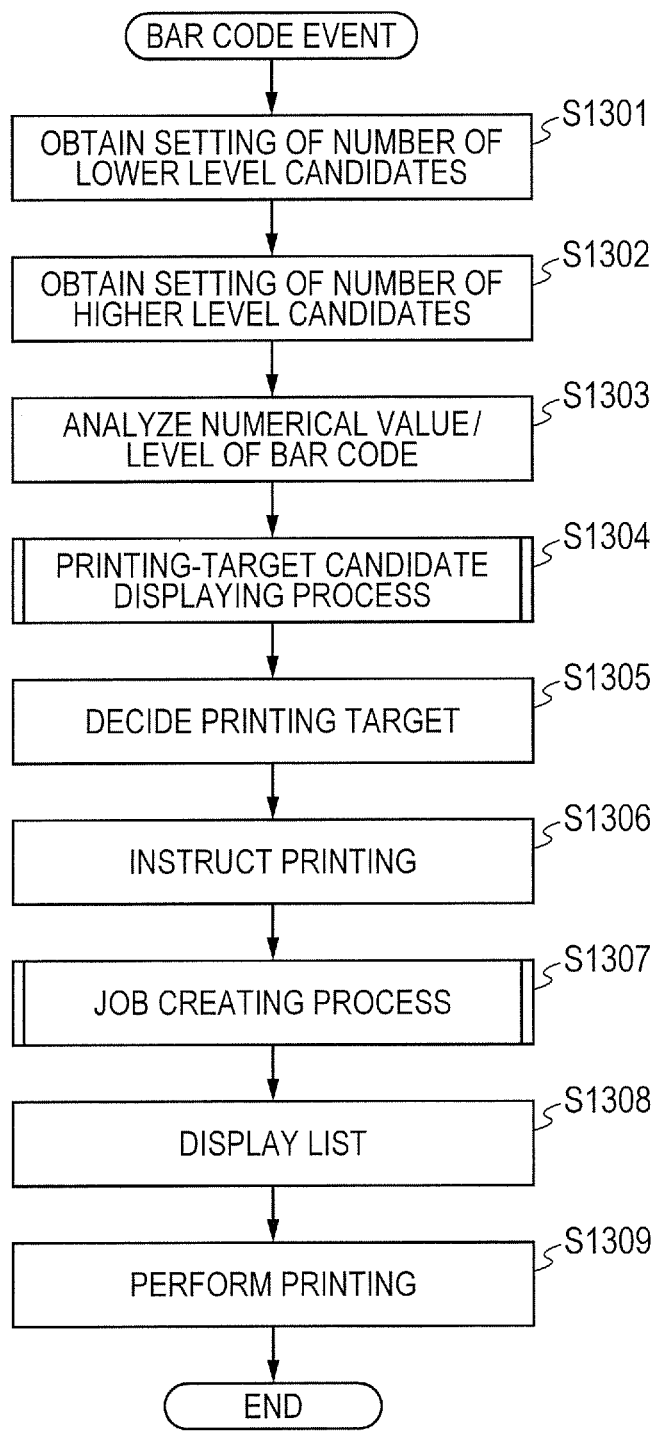
FIG. 13 is a flow chart for describing a process of a bar code application.

FIG. 13 is the flow chart for describing an example of the process of the bar code application 401 in the present embodiment.

In FIG. 13, if any bar code on the printed material as exemplarily illustrated in FIGS. 7, 9A and 9B is read, a bar code event occurs, and the process of the flow chart illustrated in FIG. 13 starts.

In S1301, the bar code managing section 408 obtains the setting of the number of lower level candidates. That is, the bar code managing section 408 judges how many levels lower than the level specified by the bar code read by the bar code reading section 409 should foe displayed as the reprinting-target candidates, based on the contents of the operations performed to the user interfaces illustrated in FIGS. 9A and 9B.

Next, in S1302, the bar code managing section 408 obtains the setting of the number of higher level candidates. That is, the bar code managing section 408 judges how many levels higher than the level specified by the bar code read by the bar code reading section 409 should, be displayed as the reprinting-target candidates, based on the contents of the operations performed to the user interfaces illustrated in FIGS. 9A and 9B.

Next, in S1303, the bar code managing section 408 analyzes the numerical value of the bar code read by the bar code reading section 409 and the level of the element specified by the read bar code.

Next, in S1304, the bar code managing section 408 controls the displaying section 410 to perform a printing-target candidate displaying process.

Here, an example of the detail of the printing-target candidate displaying process to be performed in S2304 will be described with, reference to a flow chart illustrated in FIG. 14.

Initially, in S1401, the bar code managing section 408 obtains a number j of lower level candidates obtained in S1301 and a number i of higher level candidates obtained in S1302.

Next, in S1402, the bar code managing section 408 divides the numerical, value of the bar code analyzed in S1303, by the delimiter ("-").

Next, in S1403, the bar code managing section 408 obtains the number of elements linked by the delimiter ("-"), as a number N of levels of the element identified by the read bar code.

Next, in S1404, the bar code managing section 408 discriminates the number N obtained in S1403.

If it is discriminated that the number N is "1" then, in S1405, the bar code managing section 408 judges that the order is the candidate of the reprinting target.

Likewise, if it is discriminated that the number N is "2", "3", "4" or "5", then the bar code managing section 408 judges that the delivery destination, the book, the part or the sheet in due order is the candidate of the reprinting target (S1406, S1407, S1408 or S1409).

Next, in S1410, the bar code managing section 408 controls the displaying section 410 to display the information of the elements of the (N−i)th level to the (N+j)th level on the user interface. That is, the bar code application 401 sets the element of the N-th level of the bard code judged in S1404 as the reprinting target, sets the element of the (N−i)th level and the element of the (N+j)th level as the reprinting-target candidates, and then displays the set information on the user interface.

Here, as described above, "i" indicates the number of lower level candidates in regard to the level identified by the read bar code, and "j" indicates the number of higher level candidates in regard to the level identified by the read bar code (see S1401).

Figure 14:
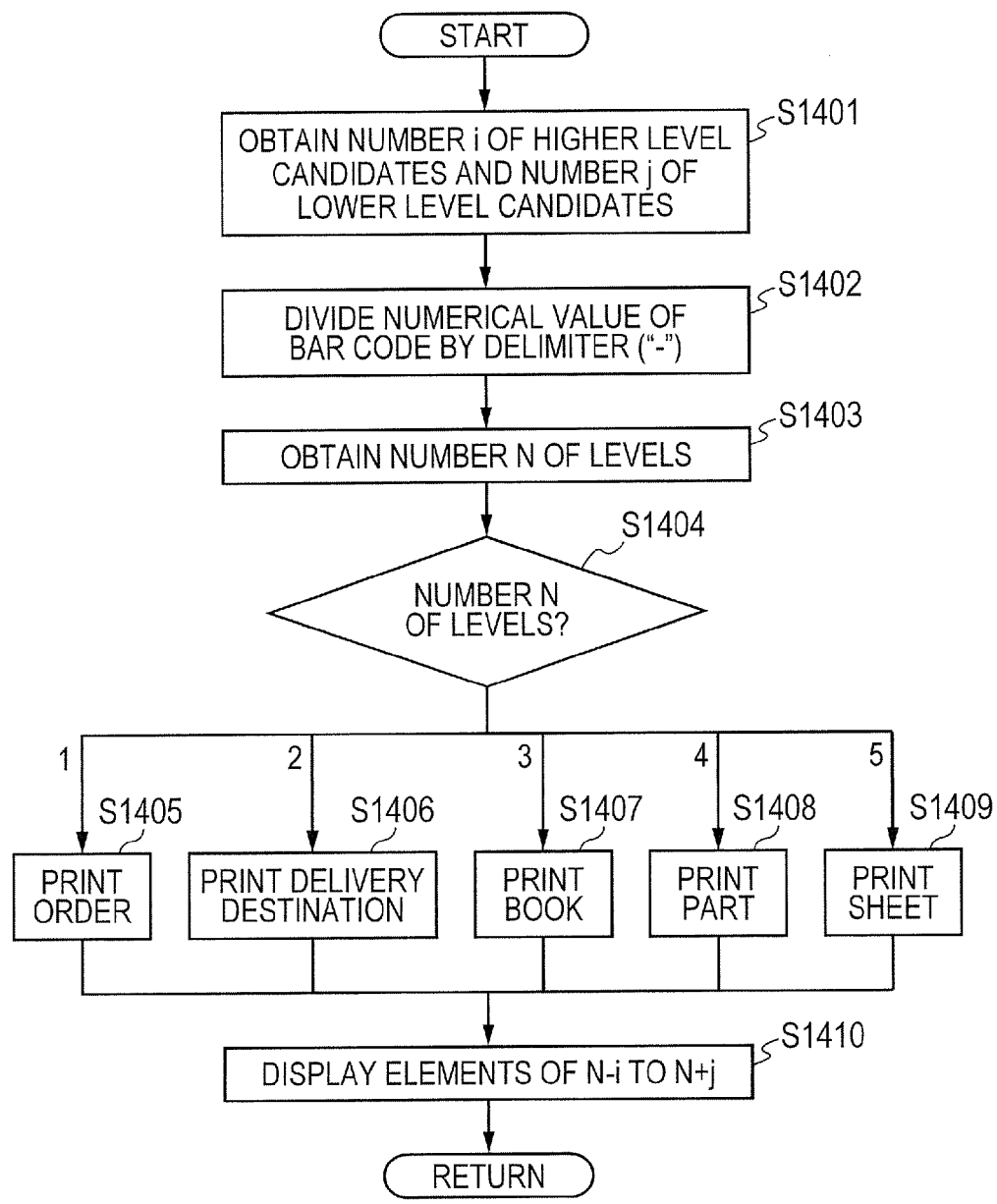
FIG. 14 is a flow chart for describing the detail of a printing-target candidate displaying process.

Then, the process of the flow chart illustrated in FIG. 14 is ended, and the process is further advanced to S1305 in FIG. 13.

In S1305, the bar code managing section 408 decides the reprinting-target element in the reprinting-target candidates, based on the operations of the operator to the user interface displayed in S1304.

Next, in S1306, the bar code managing section 408 instructs the printing based on the operation of the operator.

Next, in S1307, the bar code managing section 408 performs a job creating process.

Figure 15:
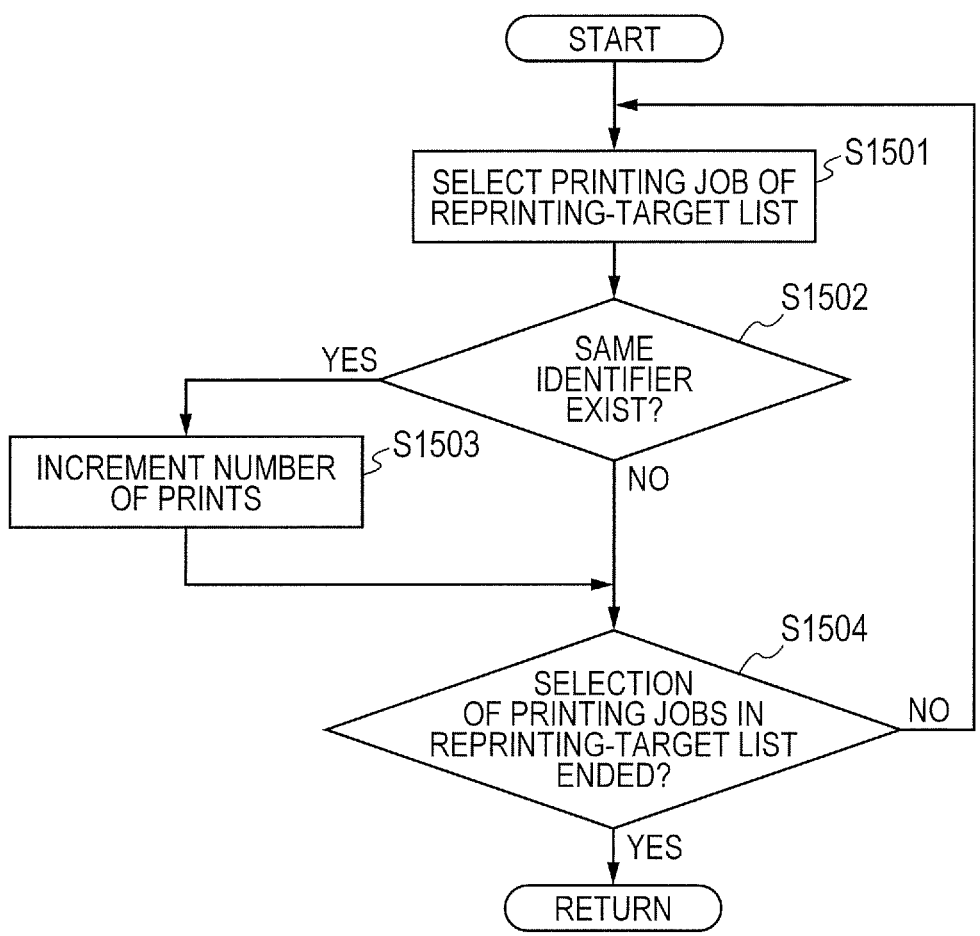
FIG. 15 is a flow chart for describing an example of the detail of a job creating process.

Here, an example of the detail of the job creating process to be performed in S1307 will be described with reference to a flow chart illustrated in FIG. 15.

Initially, in S1501, the bar code managing section 408 selects in sequence all the printing jobs (reprinting-target elements) from the printing job group list-displayed in S1308.

Next, in S1502, the bar code managing section 408 judges whether or not the element of the identifier same as the identifier of the element in the printing jobs selected in S1501 exists in the reprinting-target element decided in S1305.

If it is judged that the element of the same identifier exists, the process is advanced to S1503. In this step, the bar code managing section 408 increments the setting of the number of prints of the printing job (element) selected in S1501. In this case, the printing job for the reprinting-target element decided in S1305 is not created separately.

On the other hand, if it is judged in S1502 that the element of the same identifier does not exist, the process is advanced to S1504. In this case, the printing job for the reprinting-target element is created.

In S1504, the bar code managing section 408 judges whether or not all the printing jobs (elements) were selected in S1501. If it is judged that all the printing jobs (elements) are not selected yet, the process is returned to S1501. On the other hand, if it is judged that all the printing jobs (elements) were selected, the process of the flow chart illustrated in FIG. 15 is ended, and the process is advanced to S1308 of FIG. 13.

In S1308, the bar code managing section 408 controls the displaying section 410 to display the list of the printing jobs for which, the printing was instructed in S1306. More specifically, the bar code application 401 displays printing job list displaying screens illustrated in later-described FIGS. 16 to 18, respectively.

Next, in S1309, the bar code managing section 408 controls the communicating section 411 to instruct the reprinting of the printing jobs displayed in S1308, to the job managing application 400. In the present embodiment, an example of an instructing unit is achieved by, e.g., the process in S1309.

Then, the process of the flow chart illustrated in FIG. 13 is ended.

Subsequently, the respective processes according to the flow charts illustrated in FIGS. 13 to 15 will be described concretely.

Here, an example of the process to be performed when, in FIG. 7, the bar code string 705 of the sheet number "01-01-01-01-01" is read by the bar code application 401 will be described. Further, it is assumed that the setting of the reprinting-target candidate corresponds to the setting illustrated in FIG. 9A.

Initially, in S1301, the bar code managing section 408 obtains as the setting of the number of lower level candidates (see the edit box 902 of FIG. 9A).

Next, in S1302, the bar code managing section 408 obtains "0" as the setting of the number of higher level candidates (see the edit box 904 of FIG. 9A).

Next, the bar code managing section 408 analyzes the bar code "01-01-01-01-01" read by the bar code reading section 409 in S1303, and performs the printing-target candidate displaying process in S1304.

In the printing-target candidate displaying process, initially, in S1401 of FIG. 14, the bar code managing section 408 obtains "0" as the number i of higher level candidates and "1" as the number j of lower level candidates, respectively.

Next, in S1402, the bar code managing section 408 divides the bar code "01-01-01-01-01" read by the bar code reading section 409, by the delimiter.

Next, in S1403, the bar code managing section 408 obtains "5" as the number N of levels of the element (sheet) specified by the bar code read by the bar code reading section 409. Therefore, in S1409, the bar code managing section 408 judges that the sheet is the reprinting-target candidate.

Next, in S1410, the bar code managing section 408 controls the displaying section 410 to display the information of the elements of the fifth (=N−i=5−0) level to the sixth (=N+j=5+1) level on the user interface. However, as illustrated in FIG. 6, since the level lower than the level of the sheet 606 (sheet 1) does not exist, the fact that only the sheet 606 (sheet 1) of the fifth level is the reprinting target is displayed on the user interface. For example, the user interface 1000 illustrated in FIG. 10 is displayed here.

In S1305 of FIG. 13, if the OK button 1002 is depressed on the user interface 1000 illustrated in FIG. 10, the bar code managing section 408 decides the sheet 606 (sheet 1) as the reprinting-target element.

Next, in S1306, the bar code managing section 408 instructs the printing for the sheet 606 (sheet 1).

Next, in S1307, the bar code managing section 408 performs the job creating process.

In the job creating process, any group of the list-displayed printing jobs does not exist yet. Therefore, the bar code managing section 408 judges in S1504 that all the printing jobs were selected in S1501, the process of the flow chart illustrated in FIG. 15 is ended, and the process is advanced to S1308 illustrated in FIG. 13.

In S1303, the bar code managing section 408 controls the displaying section 410 to display a printing job list displaying screen showing the list of the printing-jobs for which the printing instruction was performed in S1306. The printing job list displaying screen to be displayed here is illustrated in FIG. 16.

On a printing job list displaying screen 1600 illustrated in FIG. 16, a printing job 1601 indicates the printing job of the sheet 606 (sheet 1) corresponding to the printing job list displaying screen.

If an OK button 1602 indicating a printing start is depressed on the printing job list displaying screen 1600, the process is advanced to S1309. In S1309, the bar-code managing section 408 controls the communicating section 411 to instruct the reprinting of the printing job 1601 displayed on the printing job list displaying screen 1600, to the job managing application 400.

Incidentally, if the reprinting of the printing job 1601 displayed on the printing job list displaying screen 1600 is not performed, the operator depresses a cancel button 1603.

Next, an example of the process to be performed when, in FIG. 7, the bar code string 703 of the book number "01-01-01" is read by the bar code application 401 and the setting of the reprinting-target candidate corresponds to the setting illustrated in FIG. 9A will be described.

The flow chart illustrated in FIG. 13 is again referred. Initially, in S1301, the bar code managing section 408 obtains "1" as the setting of the number of lower level candidates (see the edit box 902 of FIG. 9A).

Next, in S1302, the bar code managing section 408 obtains "0" as the setting of the number of higher level candidates (see the edit box 904 of FIG. 9A).

Next, the bar code managing section 403 analyzes the bar code "01-01-01" read by the bar code reading section 409 in S1303, and performs the printing-target candidate displaying process in S1304.

In the printing-target candidate displaying process, initially, in S1401 of FIG. 14, the bar code managing section 408 obtains "0" as the number i of higher level candidates and "1" as the number j of lower level candidates, respectively.

Next, in S1402, the bar code managing section 408 divides the bar code "01-01-01" read by she bar code reading section 409, by the delimiter.

Next, in S1403, the bar code managing section 408 obtains "3" as the number N of levels of the element (book) specified by the bar code read by the bar code reading section 409. Therefore, in S1407, the bar code managing section 408 judges that the book is the reprinting-target candidate.

Next, in S1410, the bar code managing section 408 controls the displaying section 410 to display the information of the elements of the third (=N–i=3–0) level to the fourth (=N+j=3+1) level on the user interface. As illustrated in FIG. 6, the parts 604 and 605 (parts 1 and 2) exist in the level lower by one than the level of the book 603 (book 1). Therefore, the fact that the book 603 (book 1) of the third level and the parts 604 and 605 (parts 1 and 2) of the fourth level are the reprinting targets is displayed on the user interface. For example, the user interface 1100 illustrated in FIG. 11 is displayed here.

As described above, it is selected by depressing the radio button 1102 to set the whole of the book 603 (book 1) indicated by the identifier "01-01-01" as the reprinting targets. On the other hand, it is selected by depressing the radio button 1103 and selecting the check box 1104 to individually set each of the parts (part 604 (part 1) and part 605 (part 2)) constituting the book 603 (book 1) as the reprinting target.

The operator specifies the reprinting targets by using the radio buttons 1102 and 1103 and the check box 1104 on the user interface 1100, and depresses the OK button 1105 for instructing the printing. Then, in S1305 of FIG. 13, the bar code managing section 408 decides the reprinting-target elements based on the operation contents on the user interface 1100. In the example illustrated in FIG. 11, the cover being the part 604 (part 1; and the body being the part 605 (part 2) are decided as the reprinting-target elements.

Next, in S1306, the bar code managing section 408 instructs the printing for the parts 604 and 605 (parts 1 and 2).

Next, in S1307, the bar code managing section 408 performs the job creating process.

In the job creating process, any group of the list-displayed printing jobs does not exist yet. Therefore, the bar code managing section 408 judges in S1504 that all the printing jobs were selected in S1501, the process of the flow chart illustrated in FIG. 15 is ended, and the process is advanced to S1308 of FIG. 13.

In S1308, the bar code managing section 408 controls the displaying section 410 to display a printing job list displaying screen 1700 illustrated in FIG. 17.

On the printing job list displaying screen 1700 illustrated, in FIG. 17, a printing job 1701 indicates the printing job of the cover being the part 604 (part 1), and a printing job 1702 indicates the printing job of the body being the part 605 (part 2).

Incidentally, as illustrated in FIG. 6, the parts 604 and 605 (parts 1 and 2) constitute the book 603 (book 1). Therefore, on the user interface 1100 illustrated in FIG. 11, even if the printing of the whole of the book 603 (book 1) is instructed, the printing job list displaying screen on which the two printing jobs of the parts 604 and 605 (parts 1 and 2) have been set as the reprinting targets is displayed as well as FIG. 17.

If an OK button 1703 indicating a printing start is depressed on the printing job list displaying screen 1700, the bar code managing section 408 performs the following process in S1309. That is, the bar code managing section 408 controls the communicating section 411 to instruct the reprinting of the printing jobs 1701 and 1702 displayed on the printing job list displaying screen 1700, to the job managing application 400.

Incidentally, it is assumed that, on the user interface 1100 illustrated in FIG. 11, the radio button 1103 is depressed and only the check box 1104 for selecting "cover" is further selected. In this case, the cover being the part 604 (part 1) is decided as the reprinting-target element, whereas the body being the part 605 (part 2) is not decided as the reprinting-target element. On the contrary, it is assumed that the radio button 1103 is depressed and only the check box 1104 for selecting "body" is further selected. In this case, the body being the part 605 (part 2) is decided as the reprinting-target element, whereas the cover being the part 604 (part 1) is not decided as the reprinting-target element.

Next, an example of the process to be performed when, in FIG. 7, the bar code string 703 of the book number "01-01-01" is read by the bar code application 401 and the setting of the reprinting-target candidate corresponds to the setting illustrated in FIG. 9B will be described.

The flow chart illustrated in FIG. 13 is again referred. Initially, in S1301, the bar code managing section obtains "0" as the setting of the number of lower level candidates (see an edit box 905 of FIG. 5B).

Next, in S1302, the bar code managing section 408 obtains "1" as the setting of the number of higher level candidates (see an edit box 906 of FIG. 9B).

Next, the bar code managing section 408 analyzes the bar code "01-01-01" read by the bar code reading section 409 in S1303, and performs the printing-target candidate displaying process in S1304.

In the printing-target candidate displaying process, initially, in S1401 of FIG. 14, the bar code managing section 403 obtains "1" as the number i of higher level candidates and "0" as the number j of lower level, candidates, respectively.

Next, in S1402, the bar code managing section 408 divides the bar code "01-01-01" read by the bar code reading section 409, by the delimiter.

Next, in S1403, the bar code managing section 408 obtains "3" as the number N of levels of the element (book) specified by the bar code read by the bar code reading section 409. Therefore, in S1407, the bar code managing section 408 judges that the book is the reprinting-target candidate.

Next, in S1410, the bar code managing section 408 controls the displaying section 410 to display the information of the elements of the second (=N–i=3–1) level to the third (=N+j=3–0) level on the user interface. As illustrated in FIG. 6, the delivery destination 602 (delivery destination 1) exists in the level higher by one than the level of the book 603 (book 1). Therefore, the fact that the books 603 and 609 (books 1 and 2) to be delivered to the delivery destination 602 (delivery destination 1) are the reprinting targets is displayed on the user interface. For example, the user interface 1200 illustrated in FIG. 12 is displayed here.

As described above, the identifiers "01" and "01-01" respectively indicating the order 601 and the delivery destination 602 (delivery destination 1) in the higher levels are displayed in the higher level displaying portion 1201. The identifiers "01-01-01" and "01-01-02" respectively indicating the books 603 and 609 (books 1 and 2) exist in the level lower by one than the level of the delivery destination 602 (delivery destination 1). The operator can designate the books 603 and 609 (books 1 and 2) as the reprinting-target elements, by the operations to the check boxes 1202 and 1203.

The operator designates the reprinting-target elements as described above, and depresses the OK button. 1204 indicating the printing instruction. Then, in S1305 of FIG. 13, the bar code managing section 408 decides the reprinting-target elements based on the contents of the operation performed to the user interface 1200. In the example illustrated in FIG. 12, the books 603 and 609 (books 1 and 2) are decided as the reprinting-target elements.

Next, in S1306, the bar code managing section 408 instructs the printing for the books 603 and 609 (books 1 and 2).

Next, in S1307, the bar code managing section 408 performs the job creating process.

In the job creating process, any group of the list-displayed printing jobs does not exist yet. Therefore, in S1504, the bar code managing section 408 judges that all the printing jobs were selected in S1501. Then, the process of the flow chart illustrated in FIG. 15 is ended, and the process is advanced to S1308 illustrated in FIG. 13.

In S1308, the bar code managing section 408 controls the displaying section 410 to display a printing job list, displaying screen 1800 illustrated in FIG. 18.

On the printing job list displaying screen 1800 illustrated in FIG. 18, a printing job 1801 indicates the printing job of the cover being the part 604 (part 1), and a printing job 1802 indicates the printing job of the body being the part 605 (part 2). Moreover, a printing job 1803 indicates the printing job of the cover being the part 610 (part 1), and a printing job 1804 indicates the printing job of the body being the part 611 (part 2).

If an OK button 1805 indicating a printing start is depressed on the printing job list displaying screen 1800, the bar code managing section 408 performs the following process in S1309. Namely, the bar code managing section 408 controls the communicating section 411 to instruct reprinting of the printing jobs 1801 to 1804 displayed on the printing job list displaying screen 1800, to the job managing application 400.

Next, an example of the process to be performed when, in FIG. 7, the bar code string 703 of the book number "01-01-01" is continuously read by the bar code application 401 several times and the setting of the reprinting-target candidate corresponds to the setting illustrated in FIG. 9A will be described.

In the first bar code reading (i.e., the first performance of the process indicated in FIG. 13), the bar code managing section 408 obtains "1" as the setting of the number of lower level candidates in S1301 (see the edit box 902 of FIG. 9A).

Next, in S1302, the bar code managing section 408 obtains "0" as the setting of the number of higher level candidates (see the edit box 904 of FIG. 9A).

Next, the bar code managing section 408 analyzes the bar code "01-01-01" read by the bar code reading section 409 in S1303, and performs the printing-target candidate displaying process in S1304.

In the printing-target candidate displaying process, first, in S1401 of FIG. 14, the bar code managing section 408 obtains "0" as the number i of higher level candidates and "1" as the number j of lower level candidates, respectively.

Next, in S1402, the bar code managing section 408 divides the bar code "01-01-01" read by the bar code reading section 409, by the delimiter.

Next, in S1403, the bar code managing section 408 obtains "3" as the number N of levels of the element (book) specified by the bar code read by the bar code reading section 409. Therefore, in S1407, the bar code managing section 408 judges that the book is the reprinting-target candidate.

Next, in S1410, the bar code managing section 408 controls the displaying section 410 to display the information of the elements of the third (=N−i=3−0) level to the fourth (=N+j=3+1) level on the user interface. As illustrated in FIG. 6, the parts 604 and 605 (parts 1 and 2) exist in the level lower by one than the level of the book 603 (book 1). Therefore, for example, the user interface 1100 illustrated in FIG. 11 is displayed.

The operator specifies the reprinting targets by using the radio buttons 1102 and 1103 and the check box 1104 on the user interface 1100, and depresses the OK button 1105 indicating the printing instruction. Then, in S1305 of FIG. 13, the bar code managing section 408 decides the reprinting-target elements based on the contents of the operation performed to the user interface 1100. In the example illustrated in FIG. 11, the cover being the part 604 (part 1) and the body being the part 605 (part 2) are decided as the reprinting-target elements.

Next, in S1306, the bar code managing section 408 instructs the printing for the parts 604 and 605 (parts 1 and 2).

Next, in S1307, the bar code managing section 408 performs the job creating process.

In the job creating process, any group of the list-displayed printing jobs does not exist yet. Therefore, in S1504, the bar code managing section 408 judges that all the printing jobs were selected in S1501. Then, the process of the flow chart illustrated in FIG. 15 is ended, and the process is advanced to S1308 illustrated in FIG. 13.

In S1308, the bar code managing section 403 controls the displaying section 410 to display the printing job list displaying section 1700 illustrated in FIG. 17.

In the state that the printing job list displaying screen 1700 illustrated in FIG. 17 is being displayed, if the bar code string 703 of the book number "01-01-01" is again read, then the process of the flow chart illustrated in FIG. 13 is performed again. In this case, the printing job list displaying screen 1700 has already been displayed at the timing when the job creating process in S1307 of FIG. 13 is performed. Therefore, in S1501, the bar code managing section 403 selects one printing job from the group of the printing jobs displayed on the printing job list displaying screen 1700. For example, the printing job 1701 is selected.

Next, in S1502, the bar code managing section 408 judges whether or not the element of the identifier same as the identifier of the element in the printing job selected in S1501 exists in the reprinting-target elements (printing jobs) decided in S1305.

The parts 604 and 605 (parts 1 and 2) exist in the reprinting-target elements (printing jobs) decided in S1305, and, as described above, the printing job 1701 is the printing job of "cover" being the part 604 (part 1). Therefore, if the printing job 1701 is selected in S1501, then it is judged that the element of the identifier same as the identifier of the element in the selected printing job exists, the process is advanced to S1503.

In S1503, the bar code managing section 408 increments the setting of the number of prints of the printing job 1701 (element) selected in S1501. Then, the process is advanced to S1504.

In S1504, the bar code managing section 408 judges whether or not all the printing jobs (elements) were selected in S1501. For example, if the printing job 1701 out of the printing jobs 1701 and 1702 is selected in the process up to the present, the printing job 1702 is not selected, yet. Therefore, it is judged that all the printing jobs (elements) are not selected, and the process is returned to S1501.

Then, in S1501, the bar code managing section 408 selects the remaining printing job 1702 displayed on the printing job list displaying screen 1700.

Next, in S1502, the bar code managing section 408 judges whether or not the element of the identifier same as the identifier of the element in the printing job 1702 selected in S1501 exists in the reprinting-target elements decided in S1305. The parts 604 and 605 (parts 1 and 2) exist in the reprinting-target elements (printing jobs) decided in S1305, and, as described above, the printing job 1702 is the printing job of "body" being the part 605 (part 2). Therefore, it is judged that the element of the identifier same as the identifier of the element in the selected printing job exists, and the process is advanced to S1503.

In S1503, the bar code managing section 408 increments the setting of the number of prints of the printing job 1702 (element) selected in S1501. Then, the process is advanced to S1504.

In S1504, the bar code managing section 408 judges that ail the printing jobs 1701 and 1702 (elements) displayed on the printing job list displaying screen 1700 were selected in S1501. Then, the process of the flow chart illustrated in FIG. 15 is ended, and the process is advanced to S1308.

In S1308, the bar code managing section 408 controls the displaying section 410 to update the printing job list displaying screen 1700 illustrated in FIG. 17. Here, a printing job list displaying screen 1900 illustrated in FIG. 19 is displayed.

On the printing job list displaying screen 1900 illustrated in FIG. 19, a printing job 1901 indicates the printing job of the cover being the part 604 (part 1), and a printing job 1902 indicates the printing job of the body being the part 605 (part 2), as well as the printing job list displaying screen 1700 illustrated in FIG. 17. However, on the printing job list displaying screen 1900 illustrated in FIG. 19, since "2" is displayed as the number of prints in each of the printing jobs 1901 and 1902, the number of the prints in the reprinting is incremented.

Next, in S1309, the bar code managing section 408 controls the communicating section 411 to instruct reprinting of the printing jobs 1901 and 1902 displayed in S1308, to the job managing application 400. As just described, the bar code managing section 408 does not individually creates the plurality of printing jobs for printing the elements having the same identifier, but instructs the job managing application 400 to perform the reprinting as the printing job of printing the plurality of number of prints.

Then, the process of the flow chart illustrated in FIG. 13 is ended.

As described above, in the present embodiment, the order and the elements constituting the order are hierarchically managed such that the order is in the uppermost level and the subsequent elements obtained hierarchically in the subsequent descending (higher to lower) steps are in the respective levels provided in descending (higher to lower) order. The range of the levels based on the level to which the element read by the bar code being the identifier of each element of the order is previously set as the range of the levels to be displayed as the candidates of the reprinting-target elements. Further, the bar code is previously printed on the printed material. Then, the operator causes to read the bar code of the element to which the reprinting is necessary. On the basis of the element obtained from the bar code and the preset range of levels, the candidates of the reprinting-target elements are display in a selectable manner. As just described, if it becomes necessary to reprint the printing paper, the bar code (identifier) on the printing paper is read by the program, and thus the candidates of the printing targets according to the read bard code are displayed. Then, the element of the reprinting target selected by the operator based on the relevant display is reprinted. Therefore, it is possible to achieve the reprinting of the printing target that the operator desires, by one printing procedure, and it is also possible to easily specify the reprinting target. Thus, it is possible to improve working efficiency for the operator when he/she performs the reprinting.

Further, in the present embodiment, if the bar codes of the elements of the same identifier are repetitively read, the printing jobs of these elements are not individually created, but the number of prints is set to the same as the number of reading, so that the printing jobs of these elements are set to one printing job. Therefore, it is possible to optimize the printing jobs.

If the bar codes of the plurality of sheets are read as the sheets belonging to the same part of the same book, it is possible, by not creating the printing jobs of these sheets individually but designating the printing pages of the relevant part, to set the printing jobs of these elements as one printing job. Moreover, if the bar code of the sheet is read, it is possible to judge the contents of the post-process to be performed to the sheet by the post-processing apparatus 103 and, based on the judged result, create the printing job for enabling or disabling the post-process in regard to the relevant sheet.

More specifically, if the bar code of the sheet to which the post-process is performed per one sheet, it is possible to create the printing job for enabling the post-process to the relevant sheet. A Z-folding process or a punching process is an example of the above post-process. Besides, if the bar code of the sheet to which the post-process is performed per a plurality of sheets, when all of the plurality of sheets are the reprinting targets, the printing job for enabling the post-process to these sheets is created. On the other hand, if all the plurality of sheets are not the printing targets, the printing job for disabling the post-process to these sheets is created. Incidentally, it is possible to judge what kind of post-process should be performed to the sheet, by, for example, information recorded in the bar code, or an inquiry by the bar code application 401 to the job managing application 400.

Incidentally, although the bar code is used as the identifier in the present embodiment, it is possible to use a QR (quick response) instead of the bar code. Also, it is possible to use another identifier which can be converted into digital information, instead of the bar code and the QR code. For example, the operator may directly input the content of the identifier to the bar code application 401.

The above embodiment merely relates to the concrete examples in case of carrying out the present invention, and the technical range or concept of the present invention should not be interrupted in a limited way. That is, the present invention can be carried out in various forms and ways without departing from its technical ideas or its main features.

According to the above embodiment of the present invention, it is possible to reduce or lower the workloads of the operator when he/she performs the reprinting.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit, of Japanese Patent Application No. 2013-261638, filed Dec. 18, 2013, which is hereby incorporated by reference herein in its entirety.

What is claimed is:

1. An information processing apparatus comprising:
   a processor; and
   a memory storing instructions which, when executed by the processor, cause the information processing apparatus to function as:
      an identifying unit configured to identify an identifier of a book generated at least from printed material of a cover and printed material of a body;
      a displaying unit configured to display a reprinting setting screen which includes a first accepting portion for instructing lump reprinting of at least the printed material of the cover and the printed material of the body necessary for generating the book of the identified identifier, a second accepting portion for instructing reprinting of printed material of a part necessary for generating the book of the identified identifier, and a third accepting portion for, when the reprinting of the printed material of the part is instructed, instructing at least the printed material of the cover or the printed material of the body; and
      a generating unit configured to generate a printing job of the printed material necessary in the identified identifier, for which the instruction of reprinting has been accepted via the reprinting setting screen,
   wherein the generating unit generates at least print jobs of the printed material of the cover and the printed material of the body included in the book of the identified identifier when the first accepting portion is selected via the reprinting setting screen,
   wherein the generating unit generates a print job of the printed material of the cover of the book of the identified identifier when the second accepting portion is selected and the printed material of the cover is instructed by the third accepting portion via the reprinting setting screen, and
   wherein the generating unit generates a print job of the printed material of the body of the book of the identified identifier when the second accepting portion is selected and the printed material of the body is instructed by the third accepting portion via the reprinting setting screen.

2. The information processing apparatus according to claim 1, wherein the instructions, when executed by the processor, cause the information processing apparatus to further function as a second displaying unit configured to display a reprinting-target setting screen including an accepting portion for designating, as an identifier for which the instruction of reprinting has been accepted via the reprinting setting screen, the identifier identified by the identifying unit, the part generating the book of the identifier identified by the identifying unit, and
   wherein the displaying unit displays the reprinting setting screen including an accepting portion for instructing reprinting of the printed material necessary in the identified identifier for which the designation has been accepted via the reprinting-target setting screen.

3. The information processing apparatus according to claim 2, wherein the identifier is managed based on a hierarchy in which the higher the identifier the higher or lower a level,
   wherein the second displaying unit displays the reprinting-target setting screen including an accepting portion for designating a hierarchical range based on a level to which the identifier identified by the identifying unit belongs, and
   wherein the displaying unit displays the reprinting setting screen including an accepting portion for instructing reprinting of the printed material necessary in the identifier which belongs to the hierarchical range for which the designation has been accepted via the reprinting-target setting screen.

4. The information processing apparatus according to claim 1, wherein, in a case where there are a plurality of times of reading of a same identifier as the identifier and the instruction of reprinting of the printed material identified by the identifier has been accepted, the generating unit generates a print job of the printed material necessary in the identifier not individually but in a lump by designating the number of prints of the printed material necessary in the identifier to a number same as a number of times of reading and issuing the instruction of reprinting of the printed material necessary in the identifier.

5. The information processing apparatus according to claim 1, wherein, in a case where an identifier of the book constituted by at least a first part and a second part is read as the identifier, the displaying unit displays the reprinting setting screen including an accepting portion for instructing reprinting of the book, reprinting of the first part, and reprinting of the second part, and
   wherein the generating unit generates a print job of the first part and the second part in a case where the instruction of reprinting of the printed material has been accepted, of the first part in a case where the instruction of reprinting of the first part has been accepted, and of the second part in a case where the instruction of reprinting of the second part has been accepted.

6. The information processing apparatus according to claim 1, wherein, in a case where an identifier of a first product constituted by at least a first part and a second part is read as the identifier, the displaying unit displays the reprinting setting screen including an accepting portion for instructing reprinting of the first product, and reprinting of at least one second product included in an order same as that for the first product and constituted by at least the first part and the second part, and wherein the generating unit generates a print job of the first part and the second part constituting the first product in a case where the instruction of reprinting of the first product has been accepted, and of the first part and the second part constituting the second product in a case where the instruction of reprinting of the second product has been accepted.

7. The information processing apparatus according to claim 1, wherein, in a case where an identifier of a first part or an identifier of a second part in the book constituted by at least the first part and the second part is read as the identifier, the displaying unit displays the reprinting setting screen including an accepting portion for instructing any one of reprinting of the part identified by the identifier, reprinting of the book, and reprinting of one or a plurality of units of papers constituting the part identified by the identifier, and wherein the generating unit generates a print job of the part in a case where an instruction of reprinting of the part identified by the identifier has been accepted, of the first part and the second part in a case where an instruction of reprinting of the book has been accepted, and of the paper in a case where the instruction of reprinting of one or the plurality of units of the papers constituting the part identified by the identifier has been accepted.

8. The information processing apparatus according to claim 1, wherein the identifier is printed on a paper to be used when constituting the book.

9. A printing controlling method comprising:

identifying an identifier of a book generated at least from printed material of a cover and printed material of a body;

displaying a reprinting setting screen which includes a first accepting portion for instructing lump reprinting of at least the printed material of the cover and the printed material of the body necessary for generating the book of the identified identifier, a second accepting portion for instructing reprinting of printed material of a part necessary for generating the book of the identified identifier, and a third accepting portion for, when the reprinting of the printed material of the part is instructed, instructing reprinting of at least the printed material of the cover or the printed material of the body; and generating a printing job of the printed material necessary in the identified identifier, for which the instruction of the reprinting has been accepted via the reprinting setting screen, wherein generating the printing job generates at least print jobs of the printed material of the cover and the printed material of the body in the book of the identified identifier when the first accepting portion is selected via the reprinting setting screen, wherein the generating the printing job generates a print job of the printed material of the cover of the book of the identified identifier when the second accepting portion is selected and the printed material of the cover is instructed by the third accepting portion via the reprinting setting screen, and wherein the generating the printing job generates a print job of the printed material of the body of the identified identifier when the second accepting portion is selected and the printed material of the body is instructed by the third accepting portion via the reprinting setting screen.

10. A non-transitory storage medium storing a program for causing a computer to perform a printing controlling method comprising:

identifying an identifier of a book generated at least from printed material of a cover and printed material of a body;

displaying a reprinting setting screen which includes a first accepting portion for instructing lump reprinting of at least the printed material of the cover and the printed material of the body necessary for generating the book of the identified identifier, a second accepting portion for instructing reprinting of printed material of a part necessary for generating the book of the identified identifier, and a third accepting portion for, when the reprinting of the printed material of the part is instructed, instructing reprinting of at least the printed material of the cover or the printed material of the body; and generating a printing job of the printed material necessary in the identified identifier, for which the instruction of the reprinting has been accepted via the reprinting setting screen, wherein generating the printing job generates at least print jobs of the printed material of the cover and the printed material of the body in the book of the identified identifier when the first accepting portion is selected via the reprinting setting screen, wherein the generating the printing job generates a print job of the printed material of the cover of the book of the identified identifier when the second accepting portion is selected and the printed material of the cover is instructed by the third accepting portion via the reprinting setting screen, and wherein the generating the printing job generates a print job of the printed material of the body of the identified identifier when the second accepting portion is selected and the printed material of the body is instructed by the third accepting portion via the reprinting setting screen.

11. The non-transitory storage medium according to claim 10, wherein the method further comprises displaying a reprinting-target setting screen including an accepting portion for designating, as an identifier for which the instruction of reprinting has been accepted via the reprinting setting screen, the part generating the book of the identifier, and wherein displaying the reprinting setting screen displays the reprinting setting screen including an accepting portion for instructing reprinting of the printed material necessary in the identifier for which the designation has been accepted via the reprinting-target setting screen.

12. The non-transitory storage medium according to claim 11, wherein the identifier is managed based on a hierarchy in which the higher the identifier the higher or lower a level, wherein displaying the reprinting-target setting screen displays the reprinting-target setting screen including an accepting portion for designating a hierarchical range based on a level to which the identifier belongs, and wherein displaying the reprinting setting screen displays the reprinting setting screen including an accepting portion for instructing reprinting of the printed material necessary in the identifier which belongs to the hierarchical range for which the designation has been accepted via the reprinting-target setting screen.

13. The non-transitory storage medium according to claim 10, wherein, in a case where there are a plurality of times of reading of a same identifier as the identifier and the instruction of reprinting of the printed material identified by the identifier has been accepted, generating the print job generates the print job of the printed material necessary in the identifier not individually but in a lump by designating the number of prints of the printed material necessary in the identifier to a number same as a number of times of reading and of reprinting of the printed material necessary in the identifier.

14. The non-transitory storage medium according to claim 10, wherein, in a case where an identifier of the book constituted by at least a first part and a second part is read as the identifier, displaying the reprinting setting screen displays the reprinting setting screen including an accepting portion for instructing reprinting of the book, reprinting of the first part and reprinting of the second part, and
    wherein generating the print job generates the print job of reprinting of the first part and the second part in a case where the instruction of reprinting of the printed material has been accepted, of the first part in a case where the instruction of reprinting of the first part has been accepted, and of the second part in a case where the instruction of reprinting of the second part has been accepted.

15. The non-transitory storage medium according to claim 10, wherein, in a case where an identifier of a first product constituted by at least a first part and a second part is read as the identifier, displaying the reprinting setting screen displays the reprinting setting screen including an accepting portion for instructing reprinting of the first product, and reprinting of at least one second product included in an order same as that for the first product and constituted by at least the first part and the second part, and
    wherein generating the printing job generates the printing job of reprinting of the first part and the second part constituting the first product in a case where the instruction of reprinting of the first product has been accepted, and of the first part and the second part constituting the second product in a case where the instruction of reprinting of the second product has been accepted.

16. The non-transitory storage medium according to claim 10, wherein, in a case where an identifier of a first part or an identifier of a second part in the book constituted by at least the first part and the second part is read as the identifier, displaying the reprinting setting screen displays the reprinting setting screen including an accepting portion for instructing reprinting of the part identified by the identifier, reprinting of the book, and reprinting of one or a plurality of units of papers constituting the part identified by the identifier, and
    wherein generating the print job generates the print job of the part in a case where an instruction of reprinting of the part identified by the identifier has been accepted, of the first part and the second part in a case where an instruction of reprinting of the book has been accepted, and of the paper in a case where the instruction of reprinting of one or the plurality of units of the papers constituting the part identified by the identifier has been accepted.

17. The non-transitory storage medium according to claim 10, wherein the identifier is printed on a paper to be used when constituting the book.

* * * * *